United States Patent [19]
Haman et al.

[11] Patent Number: 5,692,468
[45] Date of Patent: Dec. 2, 1997

[54] FUEL-INJECTED INTERNAL COMBUSTION ENGINE WITH IMPROVED COMBUSTION

[75] Inventors: David F. Haman, Buffalo Grove; Todd D. Craft, Lake Villa, both of Ill.

[73] Assignee: Outboard Marine Corporation, Waukegan, Ill.

[21] Appl. No.: 507,660

[22] Filed: Jul. 25, 1995

[51] Int. Cl.⁶ .................. F02B 1/08; F02B 19/12
[52] U.S. Cl. .................. 123/259; 123/257; 123/260; 123/305
[58] Field of Search .................. 123/257, 259, 123/260, 276, 305

[56] References Cited

U.S. PATENT DOCUMENTS

| | | | |
|---|---|---|---|
| Re. 21,750 | 3/1941 | Starr | 123/260 |
| Re. 27,367 | 5/1972 | von Seggern et al. | 123/65 |
| Re. 32,802 | 12/1988 | Kline | 123/65 VD |
| 954,219 | 4/1910 | Slick . | |
| 1,142,545 | 6/1915 | Wade . | |
| 1,157,387 | 10/1915 | Haury . | |
| 1,265,857 | 5/1918 | Wygodsky . | |
| 1,424,585 | 8/1922 | Nielsen . | |
| 1,527,923 | 2/1925 | Rothardt . | |
| 1,568,638 | 1/1926 | Summers . | |
| 1,580,340 | 4/1926 | Severin . | |
| 1,597,248 | 8/1926 | Rathbun . | |
| 1,620,124 | 3/1927 | Nielsen . | |
| 1,671,826 | 5/1928 | Joslyn . | |
| 1,942,657 | 1/1934 | Meyer | 123/75 |
| 1,967,243 | 7/1934 | Hesselman | 123/32 |
| 2,028,760 | 1/1936 | Dillstrom | 123/32 |
| 2,111,282 | 3/1938 | Edwards | 123/65 |
| 2,119,633 | 6/1938 | Edwards | 184/18 |
| 2,121,409 | 6/1938 | Ricardo | 123/65 |
| 2,154,358 | 4/1939 | Ross | 123/173 |
| 2,154,975 | 4/1939 | Dufour | 123/65 |
| 2,166,679 | 7/1939 | Burke | 123/191 |
| 2,191,745 | 2/1940 | Barkeij | 123/79 |
| 2,265,677 | 12/1941 | Straub | 123/55 |
| 2,318,333 | 5/1943 | Ricardo | 123/257 |
| 2,412,821 | 12/1946 | Malin et al. | 123/32 |
| 2,431,857 | 12/1947 | Fenney | 123/32 |
| 2,533,442 | 12/1950 | Falcon | 123/41.84 |
| 2,587,339 | 2/1952 | du Rostu | 123/32 |
| 2,638,081 | 5/1953 | Spannhake | 123/65 |
| 2,735,413 | 2/1956 | Meyer et al. | 123/32 |
| 2,742,025 | 4/1956 | Knolle et al. | 123/32 |
| 2,760,478 | 8/1956 | Boghetto | 123/191 |
| 2,768,615 | 10/1956 | Taylor et al. | 123/32 |
| 2,900,966 | 8/1959 | Brueder | 123/257 |
| 2,942,594 | 6/1960 | Turlay . | |
| 3,425,399 | 2/1969 | Ward et al. | 123/32 |
| 3,443,552 | 5/1969 | von Seggern et al. | 123/32 |
| 3,498,275 | 3/1970 | Hardenberg | 123/32 |
| 3,621,821 | 11/1971 | Jarnuszkiewicz | 123/32 ST |
| 3,680,305 | 8/1972 | Miller | 60/13 |
| 3,734,069 | 5/1973 | Akiyama et al. | 123/32 SP |
| 3,817,227 | 6/1974 | Onishi | 123/73 A |
| 3,875,909 | 4/1975 | May | 123/65 WA |
| 3,892,208 | 7/1975 | Anderson et al. | 123/32 R |
| 3,923,019 | 12/1975 | Yamada | 123/53 BA |
| 3,934,562 | 1/1976 | Isaka | 123/53 BA |
| 3,980,057 | 9/1976 | Sanda et al. | 123/32 K |
| 4,044,730 | 8/1977 | Masaaki et al. | 123/75 B |
| 4,100,082 | 7/1978 | Clason et al. | 123/196 R |
| 4,126,106 | 11/1978 | Witzky | 123/30 D |
| 4,170,966 | 10/1979 | Schmidt | 123/32 SA |
| 4,175,533 | 11/1979 | Goto et al. | 123/191 S |
| 4,182,279 | 1/1980 | Sato et al. | 123/30 C |
| 4,224,905 | 9/1980 | von Seggern et al. | 123/65 WA |
| 4,259,933 | 4/1981 | Nakanishi et al. | 123/307 |
| 4,317,432 | 3/1982 | Noguchi et al. | 123/1 R |
| 4,318,377 | 3/1982 | Occella et al. | 123/279 |
| 4,320,727 | 3/1982 | Artman | 123/289 |
| 4,370,959 | 2/1983 | McNair, Jr. | 123/295 |
| 4,416,229 | 11/1983 | Wood | 123/304 |
| 4,421,081 | 12/1983 | Nakamura et al. | 123/310 |
| 4,444,166 | 4/1984 | Kovacs et al. | 123/262 |
| 4,445,467 | 5/1984 | Westerman et al. | 123/65 R |
| 4,446,830 | 5/1984 | Simko et al. | 123/276 |
| 4,446,831 | 5/1984 | Artman | 123/286 |
| 4,452,221 | 6/1984 | Keating | 123/661 |
| 4,465,032 | 8/1984 | Artman | 123/263 |
| 4,480,620 | 11/1984 | Tange et al. | 123/478 |
| 4,481,921 | 11/1984 | Tsukahara et al. | 123/304 |
| 4,522,173 | 6/1985 | Agache | 123/276 |
| 4,538,567 | 9/1985 | Grow | 123/305 |
| 4,538,568 | 9/1985 | Fujikawa et al. | 123/310 |
| 4,545,346 | 10/1985 | Grow | 123/305 |
| 4,549,508 | 10/1985 | Fujimoto | 123/73 PP |

| | | | |
|---|---|---|---|
| 4,572,123 | 2/1986 | Evans | 123/262 |
| 4,574,753 | 3/1986 | von Seggern | 123/262 |
| 4,700,671 | 10/1987 | Matsushita | 123/196 R |
| 4,719,880 | 1/1988 | Schlunke et al. | 123/65 WA |
| 4,784,098 | 11/1988 | Artman | 123/262 |
| 4,788,942 | 12/1988 | Pouring et al. | 123/26 |
| 4,790,270 | 12/1988 | McKay et al. | 123/73 C |
| 4,844,025 | 7/1989 | Sheaffer | 123/310 |
| 4,881,513 | 11/1989 | Hamanaka | 123/664 |
| 4,899,698 | 2/1990 | Thery | 123/65 A |
| 4,920,937 | 5/1990 | Sasaki et al. | 123/305 |
| 4,926,806 | 5/1990 | Ahern et al. | 123/179 L |
| 4,942,858 | 7/1990 | Wagner et al. | 123/193 H |
| 4,964,381 | 10/1990 | Shiozaki et al. | 123/73 A |
| 5,020,484 | 6/1991 | Ishikawa et al. | 123/73 AD |
| 5,086,735 | 2/1992 | Melchior et al. | 123/65 VD |
| 5,103,777 | 4/1992 | Daikoku | 123/52 MB |
| 5,105,795 | 4/1992 | Ozawa et al. | 123/661 |
| 5,127,379 | 7/1992 | Kobayashi et al. | 123/302 |
| 5,144,919 | 9/1992 | Franz | 123/65 W |
| 5,163,396 | 11/1992 | Fukuda et al. | 123/298 |
| 5,170,759 | 12/1992 | Ito | 123/276 |
| 5,170,760 | 12/1992 | Yamada et al. | 123/295 |
| 5,205,254 | 4/1993 | Ito et al. | 123/305 |
| 5,209,200 | 5/1993 | Ahern et al. | 123/276 |
| 5,211,145 | 5/1993 | Ichikawa et al. | 123/295 |
| 5,215,053 | 6/1993 | Ito | 123/276 |
| 5,230,321 | 7/1993 | Lambert et al. | 123/661 |
| 5,233,956 | 8/1993 | Ueda et al. | 123/302 |
| 5,237,972 | 8/1993 | Groff et al. | 123/257 |
| 5,249,557 | 10/1993 | Katoh et al. | 123/305 |
| 5,269,243 | 12/1993 | Mochizuki | 123/41.55 |
| 5,291,865 | 3/1994 | Sasaki | 123/298 |
| 5,329,902 | 7/1994 | Sakamoto et al. | 123/257 |
| 5,372,105 | 12/1994 | Nagao et al. | 123/193.3 |
| 5,373,820 | 12/1994 | Sakamoto et al. | 123/295 |

FOREIGN PATENT DOCUMENTS

| | | | |
|---|---|---|---|
| 0486003 | 5/1992 | European Pat. Off. | |
| 739397 | 9/1943 | Germany | 123/305 |
| 1576002 | 5/1970 | Germany . | |
| 2544762 | 4/1977 | Germany . | |
| 0159411 | 6/1989 | Japan . | |
| 2039614 | 8/1980 | United Kingdom | 123/276 |

OTHER PUBLICATIONS

Patent Abstract of Japan A6081654 dated Mar. 22, 1994, Morikawa.

*Primary Examiner*—Andrew M. Dolinar
*Attorney, Agent, or Firm*—Jones, Day, Reavis & Pogue

[57]     ABSTRACT

An internal combustion engine comprising an engine block defining a cylinder having a longitudinal axis, an upper end, and a cross-sectional area in a plane perpendicular to the axis, a piston reciprocally moveable in the cylinder along the axis, the piston having an upper surface, a cylinder head including a lower surface portion closing the upper end of the cylinder, the lower surface portion extending generally perpendicular to the axis and having therein an upwardly extending recess, the recess having an upper end, a lower end, and a height, the lower end of the recess having an area in a plane perpendicular to the axis, the area being equal to approximately one-fifth the cross-sectional area of the cylinder, the height being equal to at least one-third of the cylinder diameter, a fuel injector supported relative to the cylinder head for injecting fuel into the recess, and a spark plug which is supported relative to the cylinder head and which extends into the recess for creating a spark.

39 Claims, 2 Drawing Sheets

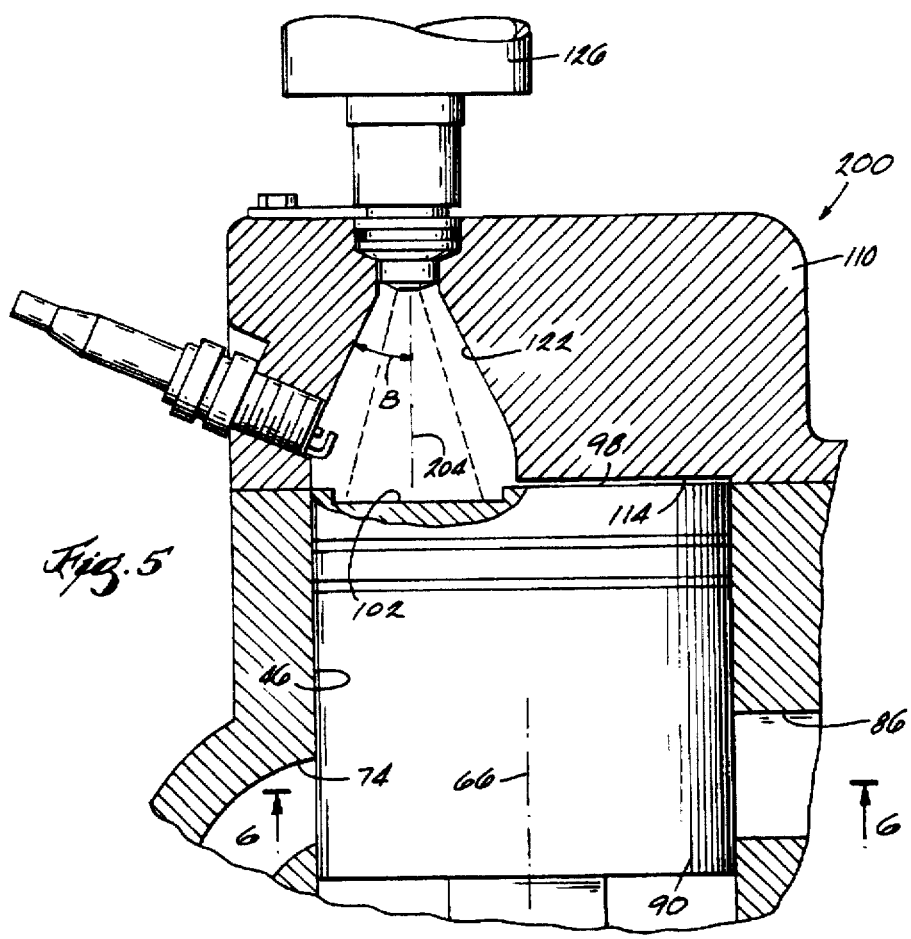
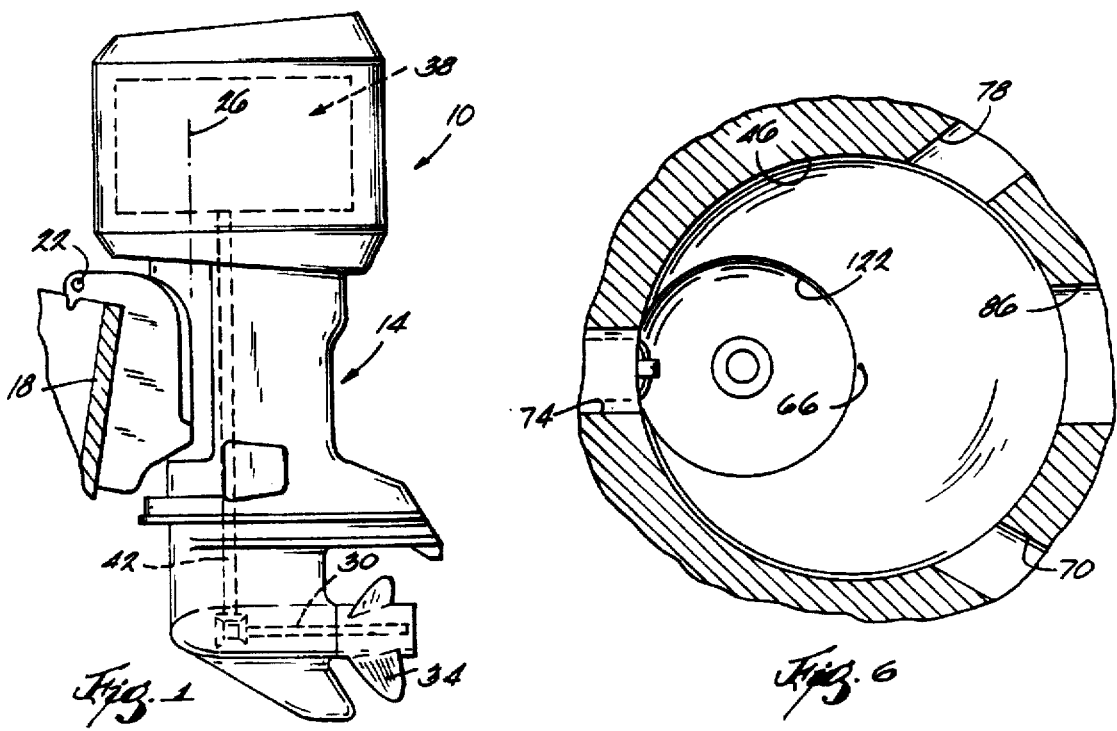

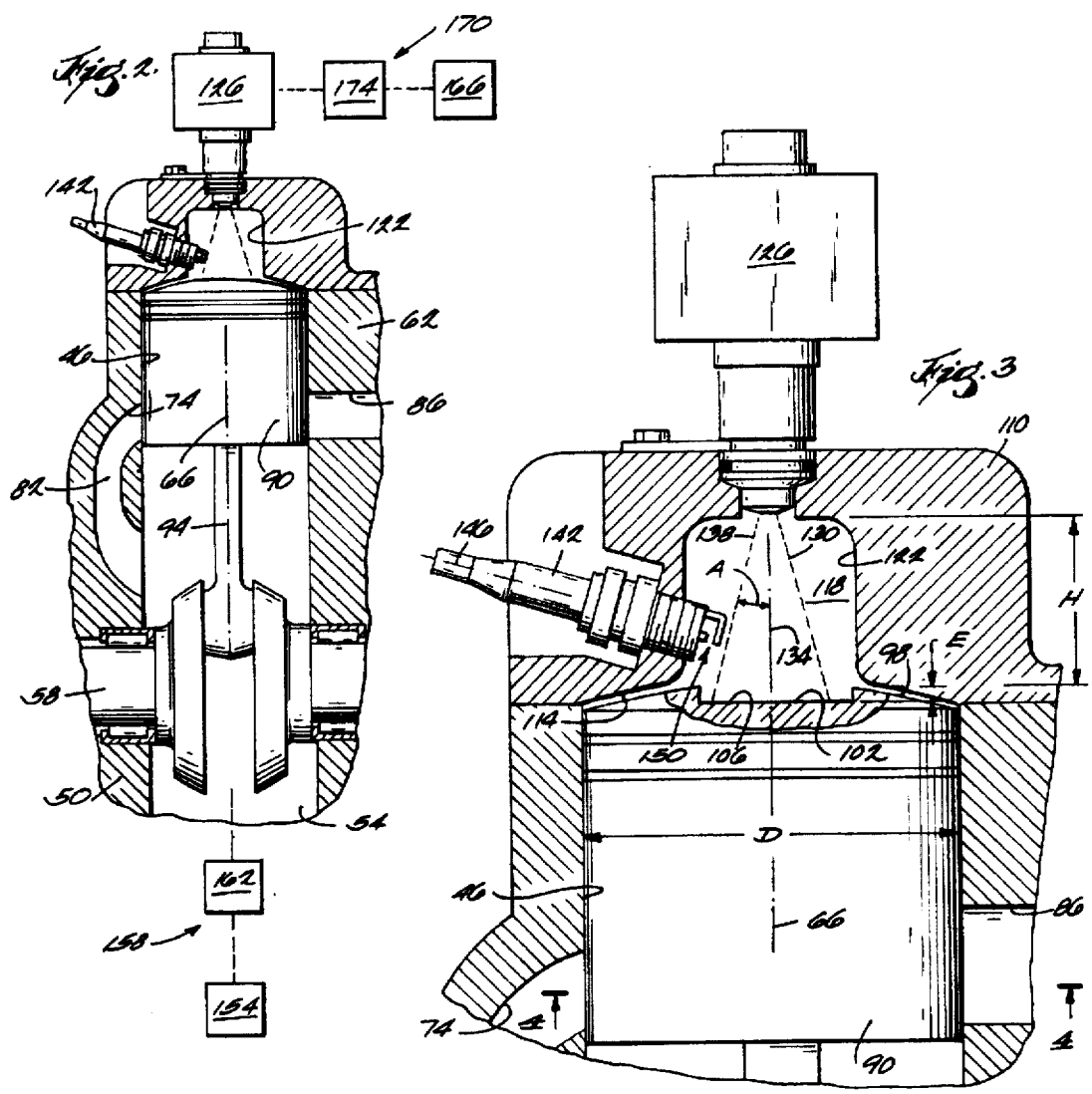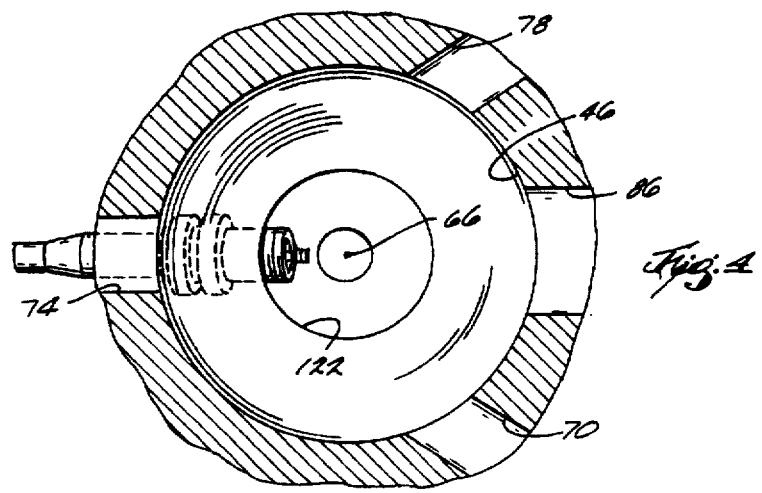

FUEL-INJECTED INTERNAL COMBUSTION ENGINE WITH IMPROVED COMBUSTION

BACKGROUND OF THE INVENTION

1. Technical Field

The invention relates to fuel-injected internal combustion engines and, more particularly, to fuel-injected two-stroke engines. Still more particularly, the invention relates to marine propulsion devices including such engines.

2. Related Prior Art

Known two-stroke internal combustion engines include a bowl in the upper surface of the piston and a dome or recess in the lower surface of the cylinder head. It is also known to locate a fuel injector at the top of the dome or recess and to have a spark plug extend into the recess. Typically, fuel spray from the fuel injector is ignited after the fuel spray bounces off the piston.

It is known to lubricate a fuel-injected two-stroke engine by mixing oil with the fuel that is injected into the cylinders. The mixing ratio can vary from 50 to 1 during high-load operation to 200 to 1 during low-load operation.

SUMMARY OF THE INVENTION

The invention provides a two-stroke, direct fuel-injected engine with an improved combustion arrangement that reduces spark plug fouling, improves running quality (especially at low speeds), reduces harmful emissions, reduces foul exhaust odors, reduces fuel consumption, and provides good stratification in the combustion chamber. These advantages are the result of the following structural features of the invention.

The squish zone and therefore turbulence are maximized for more complete mixing of fuel with air, thereby providing faster and more complete combustion.

The cylinder head includes a dome or recess having a height at least one-third of the cylinder diameter and an area about one-fourth of the cylinder head area outside of the recess (for a squish factor of four to one). The piston preferably has therein a bowl directly below the recess.

The spark plug is located so that the spark is outside the cone of fuel spray but within the volume of fuel vapor surrounding the fuel spray, so that only the fuel vapor is directly ignited.

The distance from the fuel injector nozzle to the spark plug electrode and the distance the injected fuel travels before contacting a boundary surface (cylinder head wall or piston) are maximized to allow time for the fuel spray cone to disperse into finer droplets and mix with air before ignition, providing faster, more complete ignition.

The fuel is ignited directly (versus after being reflected by the piston) to utilize the turbulence created by the injected fuel spray.

The charge is contained with the combustion chamber and piston bowl arrangement for good stratification.

A small amount of oil or lubricant (insufficient for engine lubrication) is injected with the fuel to reduce spark plug fouling.

More particularly, the invention provides an internal combustion engine comprising an engine block defining a cylinder having a longitudinal axis and an upper end, a piston reciprocally moveable in the cylinder along the axis, a cylinder head including a lower surface portion closing the upper end of the cylinder so as to define a combustion chamber between the piston upper surface and the cylinder head lower surface portion, a fuel injector supported relative to the cylinder head for injecting fuel into the combustion chamber so as to create a cone of fuel spray surrounded by a volume of fuel vapor, and a spark plug which is supported relative to the cylinder head, which extends into the combustion chamber, and which includes a spark gap located outside the fuel spray cone and within the fuel vapor volume.

The invention also provides an internal combustion engine comprising an engine block defining a cylinder having a longitudinal axis, an upper end, and a cross-sectional area in a plane perpendicular to the axis, a piston reciprocally moveable in the cylinder along the axis, the piston having an upper surface, a cylinder head including a lower surface portion closing the upper end of the cylinder, the lower surface portion extending generally perpendicular to the axis and having therein an upwardly extending recess, the recess having an upper end, a lower end, and a height, the lower end of the recess having an area in a plane perpendicular to the axis, the area being equal to approximately one-fifth the cross-sectional area of the cylinder, the height being equal to at least one-third of the cylinder diameter, a fuel injector supported relative to the cylinder head for injecting fuel into the recess, and a spark plug which is supported relative to the cylinder head and which extends into the recess for creating a spark.

The invention also provides an internal combustion engine comprising an engine block defining a cylinder having a longitudinal axis, a piston reciprocally moveable in the cylinder along the axis, the piston having an upper surface, the piston upper surface having therein a generally circular bowl, the bowl having an area in a plane perpendicular to the axis, and the bowl having a planar bottom surface perpendicular to the axis, the piston upper surface surrounding the bowl being convex, a cylinder head including a lower surface portion closing the upper end of the cylinder, the lower surface portion extending generally perpendicular to the axis and having therein an upwardly extending recess located directly above the bowl, the recess having an upper end and a lower end, the lower end of the recess having an area in a plane perpendicular to the axis, the recess area being greater than the bowl area, the cylinder head lower surface portion surrounding the recess being concave and complementary with the piston upper surface, a fuel injector supported relative to the cylinder head for injecting fuel into the recess, and a spark plug which is supported relative to the cylinder head and which extends into the recess for creating a spark.

The invention also provides an internal combustion engine comprising an engine block defining a cylinder having a longitudinal axis, an upper end, a piston reciprocally moveable in the cylinder along the axis, the piston having an upper surface, a cylinder head including a lower surface portion closing the upper end of the cylinder, the lower surface portion extending generally perpendicular to the axis and having therein an upwardly extending recess, the recess having an upper end, a fuel injector supported relative to the cylinder head for injecting into the upper end of the recess a cone of fuel spray, the fuel spray cone being centered on a cone axis parallel to the cylinder axis, such that the distance from the spark gap to the upper end of the recess is greater than the distance from the spark gap to the piston upper surface when the piston is at top dead center, and a spark plug which is supported relative to the cylinder head and which extends into the recess for creating a spark.

The invention also provides an internal combustion engine comprising an engine block defining a cylinder having a longitudinal axis, an upper end, a piston reciprocally moveable in the cylinder along the axis, the piston having an upper surface, a cylinder head including a lower surface portion closing the upper end of the cylinder, the lower surface portion extending generally perpendicular to the axis and having therein an upwardly extending recess, the recess having an upper end, a fuel injector supported relative to the cylinder head for injecting into the upper end of the recess a cone of fuel spray, the fuel spray cone being centered on a cone axis parallel to the cylinder axis, and a spark plug which is supported relative to the cylinder head and which extends into the recess for creating a spark which ignites the fuel spray before the fuel spray strikes the piston upper surface.

The invention also provides an internal combustion engine comprising an engine block defining a cylinder having a longitudinal axis, an upper end, and a cross-sectional area in a plane perpendicular to the axis, the engine block also defining intake and exhaust ports communicating with the cylinder, the ports being generally diametrically opposed relative to the cylinder, a piston reciprocally moveable in the cylinder along the axis, the piston having an upper surface having therein a generally circular bowl, the bowl having an area in a plane perpendicular to the axis, and the bowl having a planar bottom surface perpendicular to the axis, a cylinder head including a lower surface portion closing the upper end of the cylinder, the lower surface portion extending generally perpendicular to the axis and having therein an upwardly extending recess, the recess being located directly above the bowl, and the recess having an upper end, a lower end, and a height, the lower end of the recess having an area in a plane perpendicular to the axis, the recess area being equal to approximately one-fifth the cross-sectional area of the cylinder, and the recess area being greater than the bowl area, the height being equal to at least one-third of the cylinder diameter, a fuel injector supported relative to the cylinder head for injecting fuel into the upper end of the recess so as to create a cone of fuel spray surrounded by a volume of fuel vapor, the cone being centered on a cone axis parallel to the cylinder axis such that substantially the entirety of the fuel spray cone strikes the piston upper surface before striking any other surface, and a spark plug which is supported relative to the cylinder head, which extends into the recess, and which includes a spark gap located outside the fuel spray cone and within the fuel vapor volume, the distance from the spark gap to the upper end of the recess being greater than the distance from the spark gap to the piston upper surface when the piston is at top dead center, and the spark plug being located directly above the intake port such that the spark plug ignites the fuel spray before the fuel spray strikes the piston upper surface.

The invention also provides a marine propulsion device comprising a drive unit which is adapted to be mounted on a boat and which includes a propeller shaft, and an internal combustion engine drivingly connected to the propeller shaft, the engine including a crankcase having a crankshaft rotatable therein, an engine block defining a cylinder having an upper end, a piston which is reciprocally moveable in the cylinder and which is drivingly connected to the crankshaft, a cylinder head including a lower surface portion closing the upper end of the cylinder so as to define a combustion chamber between the piston upper surface and the cylinder head lower surface portion, a source of primary lubricant, a lubricant supply system for supplying the primary lubricant to the crankcase, a spark plug which is supported relative to the cylinder head and which extends into the combustion chamber, a source of fuel, a source of secondary lubricant, and a fuel injector which is supported relative to the cylinder head, which communicates with the fuel source and with the secondary lubricant source, and which injects fuel and secondary lubricant into the combustion chamber, so that the secondary lubricant reduces spark plug fouling.

The invention also provides an internal combustion engine comprising a crankcase having a crankshaft rotatable therein, an engine block defining a cylinder having an upper end, a piston which is reciprocally moveable in the cylinder and which is drivingly connected to the crankshaft, a cylinder head including a lower surface portion closing the upper end of the cylinder so as to define a combustion chamber between the piston upper surface and the cylinder head lower surface portion, a source of primary lubricant, a lubricant supply system for supplying the primary lubricant to the crankcase, a spark plug which is supported relative to the cylinder head and which extends into the combustion chamber, a source of fuel, a source of secondary lubricant, and a fuel injector which is supported relative to the cylinder head, which communicates with the fuel source and with the secondary lubricant source, and which injects fuel and secondary lubricant into the combustion chamber, so that the secondary lubricant reduces spark plug fouling.

The invention also provides a method of operating a two-stroke, fuel-injected internal combustion engine so as to reduce spark plug fouling, the engine including a combustion chamber, a spark plug extending into the combustion chamber, and a fuel injector, the method comprising the step of injecting into the combustion chamber, via the fuel injector, an amount of lubricant insufficient to adequately lubricate the engine but sufficient to reduce spark plug fouling.

Other features and advantages of the invention will become apparent to those skilled in the art upon review of the following detailed description, claims and drawings.

BRIEF DESCRIPTION OF THE DRAWINGS

FIG. 1 is a side elevational view of a marine propulsion device embodying the invention.

FIG. 2 is a partial sectional view of the engine of the marine propulsion device.

FIG. 3 is an enlarged portion of FIG. 2.

FIG. 4 is a view taken along line 4—4 in FIG. 3 and with the piston removed.

FIG. 5 is a view similar to FIG. 3 of an alternative embodiment of the invention.

FIG. 6 is a view taken along line 6—6 in FIG. 5 and with the piston removed.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

A marine propulsion device 10 embodying the invention is illustrated in FIG. 1. The marine propulsion device 10 includes an outboard drive unit 14 adapted to be mounted the transom 18 of a boat for pivotal tilting movement relative thereto about a generally horizontal tilt axis 22 and for pivotal steering movement relative thereto about a generally vertical steering axis 26. The drive unit 14 includes a propeller shaft 30 having a propeller 34 fixed thereto. The drive unit 14 also includes a fuel-injected, two-stroke internal combustion engine 38 drivingly connected to the propeller shaft 30 by a conventional drive train 42. In the preferred embodiment of the invention, the engine 38 is a six-cylinder V-type engine. It should be understood, however, that the invention is applicable to other types of engines with any number of cylinders.

One cylinder 46 of the engine 38 is illustrated in FIG. 2. The engine 38 includes a crankcase 50 defining a crankcase chamber 54 and having a crankshaft 58 rotatable therein. An engine block 62 defines the cylinder 46, which has a longitudinal axis 66 and an upper end (the upper end in FIG. 2). In the illustrated construction, the cylinder 46 has a diameter D of 3.600 inches, so that the cross-sectional area of the cylinder 46 in a plane perpendicular to the axis 66 is approximately 10.18 square inches. The engine block 62 also defines (see FIG. 4) three intake ports 70, 74 and 78 communicating with the cylinder 46. Each of the ports communicates with the crankcase chamber 54 via a respective transfer passage 82 (one shown in FIG. 2). The engine block 62 also defines an exhaust port 86 which communicates with the cylinder 46 and which is located diametrically opposite the intake port 74. This construction is well known in the art and will not described in greater detail.

The engine 38 also includes a piston 90 reciprocally moveable in the cylinder 46 along the axis 66. The piston 90 is drivingly connected to the crankshaft 58 by a crank pin 94. The piston 90 has (see FIG. 3) an upper surface 98 having therein a circular bowl 102. The bowl 102 has a planar bottom surface 106 perpendicular to the axis 66. In the illustrated construction, the bowl 102 has a diameter of 1.310 inches and a depth E of 0.100 inch. The upper surface 98 surrounding the bowl 102 is convex, defining a portion of a sphere having a radius of 5.750 inches.

The engine 38 also includes a cylinder head 110 including a lower surface portion 114 closing the upper end of the cylinder 46 so as to define a combustion chamber 118 between the piston upper surface 98 and the cylinder head lower surface portion 114. When the piston 90 is at top dead center, the piston upper surface 98 is spaced 0.040 inch from the cylinder head lower surface portion 114. The cylinder head lower surface portion 114 extends generally perpendicular to the cylinder axis 66 and has therein an upwardly extending recess or dome 122. The cylinder head lower surface portion 114 surrounding the recess 122 is concave and is complementary with the piston upper surface 98. The recess 122 is located directly above the bowl 102 and is generally cylindrical, being centered on the cylinder axis 66. The recess 122 has an upper end and a lower end (the upper and lower ends in FIG. 3). In the illustrated construction, the recess 122 has a diameter of 1.600 inches and an area in a plane perpendicular to the cylinder axis 66 of approximately 2.011 square inches. Thus, the recess area is equal to approximately one-fifth the cross-sectional area of the cylinder 46, so that the combustion chamber 118 has a squish factor of approximately four to one. (The squish factor is the ratio of the area of the cylinder 46 outside the recess 122 to the area of the recess 122.) Also, in the illustrated construction, the recess 122 has a height H of 1.770 inches, so that the height is approximately one-half the cylinder diameter.

The engine 38 also includes a fuel injector 126 mounted on the cylinder head 110 for injecting fuel into the upper end of the recess 122. The preferred fuel injector 126 is disclosed in U.S. Ser. No. 08/506,534, filed Jul. 25, 1995 and titled "Combined Pressure Surge Fuel Pump and Nozzle Assembly". The fuel injector 126 creates a cone 130 of fuel spray surrounded by a volume of fuel vapor, the cone 130 being centered on the cylinder axis 66. Preferably, substantially the entirety of the fuel spray cone 130 strikes the bottom surface 106 of the bowl 102 before striking any other surface. As shown in FIG. 3, the fuel spray cone 130 is centered on a cone axis 134 (also the cylinder axis 66) and has an outside defining a line 138 in a plane including the cone axis 134 (the plane of the paper), the line 138 and the cone axis 134 forming an acute angle A. In the illustrated construction, the angle A is approximately 15°.

The engine 38 also includes a spark plug 142 which is mounted on the cylinder head 110 and which extends into the recess 122. In the illustrated construction, the spark plug 142 extends along a plug axis 146 which is located in the plane of the cone axis 134 and the line 138 and which is perpendicular to the line 138. Also, the spark plug 142 is located directly above the intake port 74. The spark plug 142 includes a spark gap 150 located outside the fuel spray cone 130 and within the fuel vapor volume, so that the spark plug 142 initially ignites fuel vapor rather than directly igniting the fuel spray. The distance from the spark gap 150 to the upper end of the recess 122 is greater than the distance from the spark gap 150 to the piston upper surface 98 when the piston 90 is at top dead center. In the illustrated construction, the spark gap 150 is spaced approximately twice as far from the upper end of the recess 122 as it is from the piston upper surface 98 when the piston 90 is at top dead center. Ignition is timed so that the spark plug 142 ignites the fuel spray before the fuel spray strikes the piston upper surface 98.

The engine 38 also includes a source of primary lubricant, i.e. an oil tank 154 (shown schematically in FIG. 2), and a lubricant supply system 158 for supplying oil from the oil tank 154 to the crankcase 50 of the engine 38. The lubricant supply system 158 includes an oil pump 162 communicating between the oil tank 154 and the crankcase chamber 54. The preferred lubricant supply system 158 is disclosed in part in U.S. Ser. No. 08/507,051, filed Jul. 25, 1995 and titled "Oil Lubricating System For A Two-Stroke Internal Combustion Engine", now U.S. Pat. No. 5,632,241. The lubricant supply system 158 supplies oil directly to the various crankcase chambers 54 of the engine 38.

The engine 38 also includes a source of fuel, i.e. a fuel tank 166 (shown schematically in FIG. 2), and a fuel supply system 170 for supplying fuel to the various fuel injectors 126 of the engine 38. The fuel supply system 170 includes a fuel pump 174 communicating between the fuel tank 166 and the fuel injectors 126. The preferred fuel supply system 170 and portions of the lubricant supply system 158 are disclosed in U.S. Ser. No. 08/507,135, filed Jul. 25, 1995 and titled "Combined Fuel and Oil Pump For Internal Combustion Engine".

The engine 38 preferably also includes a source of secondary lubricant which is mixed with the fuel injected into the cylinders 46. Although a separate lubricant source could be employed, in the illustrated construction, the source of fuel and the source of secondary lubricant are a single tank (the fuel tank 166) of mixed fuel and oil. The ratio of fuel to secondary lubricant by volume is preferably within the range of 50:1 to 300:1 and does not vary with engine speed. In the preferred embodiment, the ratio is approximately 250:1, i.e., substantially greater than 200:1, at all engine speeds. In other words, the amount of secondary lubricant injected into the cylinders 46 by the fuel injectors 126 is substantially less than is necessary to adequately lubricate the engine 38. The purpose of the secondary lubricant is not lubrication of the engine 38, but is reduction of spark plug fouling. It has been found that mixing a relatively small amount of oil with the injected fuel significantly reduces spark plug fouling. In an alternative embodiment of the invention, the secondary lubricant is provided by a combined fuel and oil pump drawing fuel and oil from separate tanks. Any suitable fuel and oil pump can be employed. Another alternative would be using a completely separate oil pump drawing from a separate oil tank.

An engine 200 that is an alternative embodiment of the invention is illustrated in FIGS. 4 and 5. Except as described below, the engine 200 is substantially identical to the engine 38 illustrated in FIGS. 2 and 3, and common elements have been given the same reference numerals.

In the engine 200, the recess 122 is generally conical and converges upwardly. The recess 122 is centered on a line 204 parallel to and offset from the cylinder axis 66, and the engine block 62 and cylinder head 110 provide a smooth transition between the cylinder 46 and the recess 122 at a point directly above the intake port 74. In other words, referring to FIG. 6, the wall of the recess 122 is tangential with the wall of the cylinder 46 at a point directly above the intake port 74. The wall of the recess 122 defines an angle B of approximately 24° relative to the center line 204 of the recess 122. Also, as shown in FIG. 5, the wall of the recess 122 extends vertically adjacent the lower end thereof, with a smooth transition between the angled and vertical portions. In the engine 200, the piston bowl 102 is also offset from the cylinder axis 66 and is located directly below the recess 122. The piston upper surface 98 of the engine 200 is planar, rather than convex, and the cylinder head lower surface portion 114 surrounding the recess 122 is also planar.

Various features of the invention are set forth in the following claims.

We claim:

1. An internal combustion engine comprising
an engine block defining a cylinder having a longitudinal axis and an upper end,
a piston reciprocally moveable in said cylinder along said axis,
a cylinder head including a lower surface portion closing said upper end of said cylinder so as to define a combustion chamber between said piston upper surface and said cylinder head lower surface portion, said cylinder head lower surface portion extending generally perpendicular to said axis and having therein an upwardly extending recess, said recess being generally cylindrical and being centered on said cylinder axis,
a fuel injector supported relative to said cylinder head for injecting fuel into said combustion chamber so as to create a cone of fuel spray surrounded by a volume of fuel vapor, and
a spark plug which is supported relative to said cylinder head, which extends into said combustion chamber, and which includes a spark gap located outside said fuel spray cone and within said fuel vapor volume.

2. An engine as set forth in claim 1 wherein said cone is centered on a cone axis coaxial with said cylinder axis.

3. An engine as set forth in claim 1 wherein said cylinder has a cross-sectional area in a plane perpendicular to said cylinder axis, and wherein said recess has an upper end and a lower end, said lower end of said recess having an area in a plane perpendicular to said cylinder axis, said area being equal to approximately one-fifth said cross-sectional area of said cylinder.

4. An engine as set forth in claim 1 wherein said recess has a height equal to at least one-third of said cylinder diameter.

5. An engine as set forth in claim 1 wherein said piston upper surface has therein a generally circular bowl, and wherein said recess is located directly above said bowl.

6. An engine as set forth in claim 5 wherein said bowl has an area in a plane perpendicular to said cylinder axis, said bowl area being less than said recess area.

7. An engine as set forth in claim 6 wherein said bowl has a planar bottom surface perpendicular to said cylinder axis.

8. An engine as set forth in claim 7 wherein said piston upper surface surrounding said bowl is convex, and wherein said cylinder head lower surface portion surrounding said recess is concave and complementary with said piston upper surface.

9. An engine as set forth in claim 1 wherein said recess has a lower end having an area in a plane perpendicular to said cylinder axis, wherein said piston upper surface has therein a generally circular bowl, said bowl having an area in a plane perpendicular to said cylinder axis, said bowl area being less than said recess area, and said bowl having a planar bottom surface perpendicular to said cylinder axis, wherein said piston upper surface surrounding said bowl is convex, wherein said recess is located directly above said bowl, and wherein said cylinder head lower surface portion surrounding said recess is concave and complementary with said piston upper surface.

10. An engine as set forth in claim 1 wherein said height of said recess is approximately one-half of said cylinder diameter.

11. An engine as set forth in claim 1 wherein said recess has an upper end, wherein said fuel injector injects fuel into said upper end of said recess, wherein said fuel spray cone is centered on a cone axis coaxial with said cylinder axis, and wherein substantially the entirety of said fuel spray cone strikes said piston upper surface before striking any other surface.

12. An engine as set forth in claim 1 wherein said recess has an upper end, wherein said fuel injector injects fuel into said upper end of said recess, wherein said fuel spray cone is centered on a cone axis coaxial with said cylinder axis, and wherein the distance from said spark gap to said upper end of said recess is greater than the distance from said spark gap to said piston upper surface when said piston is at top dead center.

13. An engine as set forth in claim 1 wherein said spark plug ignites said fuel spray before said fuel spray strikes said piston upper surface.

14. An engine as set forth in claim 1 wherein said engine block also defines intake and exhaust ports communicating with said cylinder, said ports being generally diametrically opposed relative to said cylinder, and wherein said spark plug is located directly above said intake port.

15. An engine as set forth in claim 1 wherein said fuel spray cone is centered on a cone axis and has an outside defining a line in a plane including said cone axis, said line and said cone axis forming an acute angle, and wherein said spark plug extends along a plug axis which is located in said plane and which is perpendicular to said line.

16. An internal combustion engine comprising
an engine block defining a cylinder having a longitudinal axis, an upper end, and a cross-sectional area in a plane perpendicular to said axis,
a piston reciprocally moveable in said cylinder along said axis, said piston having an upper surface, said piston upper surface having therein a generally circular bowl,
a cylinder head including a lower surface portion closing said upper end of said cylinder, said lower surface portion extending generally perpendicular to said axis and having therein an upwardly extending recess, said recess having an upper end, a lower end, and a height, said lower end of said recess having an area in a plane perpendicular to said axis, said area being equal to approximately one-fifth said cross-sectional area of said cylinder, said height being equal to at least one-third of said cylinder diameter, said recess being located directly above said bowl, a fuel injector supported relative to said cylinder head for injecting fuel into said recess, and a spark plug which is supported relative to said cylinder head and which extends into said recess for creating a spark.

17. An engine as set forth in claim 16 wherein said bowl has an area in a plane perpendicular to said cylinder axis, said bowl area being less than said recess area.

18. An engine as set forth in claim 17 wherein said bowl has a planar bottom surface perpendicular to said cylinder axis.

19. An engine as set forth in claim 18 wherein said piston upper surface surrounding said bowl is convex, and wherein said cylinder head lower surface portion surrounding said recess is concave and complementary with said piston upper surface.

20. An engine as set forth in claim 16 wherein said fuel injector injects into said upper end of said recess a fuel spray cone centered on a cone axis parallel to or coaxial with said cylinder axis.

21. An engine as set forth in claim 16 wherein said fuel injector injects into said upper end of said recess a fuel spray cone centered on a cone axis parallel to or coaxial with said cylinder axis, and wherein substantially the entirety of said fuel spray cone strikes said piston upper surface before striking any other surface.

22. An engine as set forth in claim 16 wherein said fuel injector injects into said upper end of said recess a fuel spray cone centered on a cone axis parallel to or coaxial with said cylinder axis, wherein said spark plug includes a spark gap, and wherein the distance from said spark gap to said upper end of said recess is greater than the distance from said spark gap to said piston upper surface when said piston is at top dead center.

23. An internal combustion engine comprising an engine block defining a cylinder having a longitudinal axis, an upper end, and a cross-sectional area in a plane perpendicular to said axis, a piston reciprocally moveable in said cylinder along said axis, said piston having an upper surface, a cylinder head including a lower surface portion closing said upper end of said cylinder, said lower surface portion extending generally perpendicular to said axis and having therein an upwardly extending recess, said recess having an upper end, a lower end, and a height, said lower end of said recess having an area in a plane perpendicular to said axis, said area being equal to approximately one-fifth said cross-sectional area of said cylinder, said height being equal to at least one-third of said cylinder diameter, said recess being generally cylindrical, a fuel injector supported relative to said cylinder head for injecting fuel into said recess, and a spark plug which is supported relative to said cylinder head and which extends into said recess for creating a spark.

24. An engine as set forth in claim 23 wherein said recess is centered on said cylinder axis.

25. An internal combustion engine comprising:

an engine block defining a cylinder having a longitudinal axis, an upper end, and a cross-sectional area in a plane perpendicular to said axis;

a piston reciprocally moveable in said cylinder along said axis, said piston having an upper surface;

a cylinder head including a lower surface portion closing said upper end of said cylinder, said lower surface portion extending generally perpendicular to said axis and having therein an upwardly extending recess, said recess having an upper end, a lower end, and a height, said lower end of said recess having an area in a plane perpendicular to said axis, said area being equal to approximately one-fifth said cross-sectional area of said cylinder, said height of said recess being approximately one-half of said cylinder diameter;

a fuel injector supported relative to said cylinder head for injecting fuel into said recess; and a spark plug which is supported relative to said cylinder head and which extends into said recess for creating a spark.

26. An internal combustion engine comprising an engine block defining a cylinder having a longitudinal axis, an upper end, and a cross-sectional area in a plane perpendicular to said axis, a piston reciprocally moveable in said cylinder along said axis, said piston having an upper surface, said piston upper surface being convex, a cylinder head including a lower surface portion closing said upper end of said cylinder, said lower surface portion extending generally perpendicular to said axis and having therein an upwardly extending recess, said recess having an upper end, a lower end, and a height, said lower end of said recess having an area in a plane perpendicular to said axis, said area being equal to approximately one-fifth said cross-sectional area of said cylinder, said height being equal to at least one-third of said cylinder diameter, said cylinder head lower surface portion being concave and complementary with said piston upper surface, a fuel injector supported relative to said cylinder head for injecting fuel into said recess, and a spark plug which is supported relative to said cylinder head and which extends into said recess for creating a spark.

27. An internal combustion engine comprising an engine block defining a cylinder having a longitudinal axis, an upper end, and a cross-sectional area in a plane perpendicular to said axis, a piston reciprocally moveable in said cylinder along said axis, said piston having an upper surface, a cylinder head including a lower surface portion closing said upper end of said cylinder, said lower surface portion extending generally perpendicular to said axis and having therein an upwardly extending recess, said recess having an upper end, a lower end, and a height, said lower end of said recess having an area in a plane perpendicular to said axis, said area being equal to approximately one-fifth said cross-sectional area of said cylinder, said height being equal to at least one-third of said cylinder diameter, a fuel injector supported relative to said cylinder head for injecting fuel into said recess, and a spark plug which is supported relative to said cylinder head and which extends into said recess for creating a spark, wherein said piston upper surface has therein a generally circular bowl, said bowl having an area in a plane perpendicular to said cylinder axis, said bowl area being less than said recess area, and said bowl having a planar bottom surface perpendicular to said cylinder axis, wherein said piston upper surface surrounding said bowl is convex, wherein said recess is located directly above said bowl, and wherein said cylinder head lower surface portion surrounding said recess is concave and complementary with said piston upper surface.

28. An internal combustion engine comprising an engine block defining a cylinder having a longitudinal axis, an upper end, and a cross-sectional area in a plane perpendicular to said axis, a piston reciprocally moveable in said cylinder along said axis, said piston having an upper surface, a cylinder head including a lower surface portion closing said upper end of said cylinder, said lower surface portion extending generally perpendicular to said axis and having therein an upwardly extending recess, said recess having an upper end, a lower end, and a height, said lower end of said recess having an area in a plane perpendicular to said axis, said area being equal to approximately one-fifth said cross-sectional area of said cylinder, said height being equal to at least one-third of said cylinder diameter, a fuel injector supported relative to said cylinder head for injecting fuel into said recess, said fuel injector injecting a fuel spray into said upper end of said recess, and a spark plug which is supported relative to said cylinder head and which extends into said recess for creating a spark, said spark plug igniting said fuel spray before said fuel spray strikes said piston upper surface.

29. An internal combustion engine comprising an engine block defining a cylinder having a longitudinal axis, an upper end, and a cross-sectional area in a plane perpendicular to said axis, said engine block also defining intake and exhaust ports communicating with said cylinder, said ports being generally diametrically opposed relative to said cylinder, a piston reciprocally moveable in said cylinder along said axis, said piston having an upper surface, a cylinder head including a lower surface portion closing said upper end of said cylinder, said lower surface portion extending generally perpendicular to said axis and having therein an upwardly extending recess, said recess having an upper end, a lower end, and a height, said lower end of said recess having an area in a plane perpendicular to said axis, said area being equal to approximately one-fifth said cross-sectional area of said cylinder, said height being equal to at least one-third of said cylinder diameter, a fuel injector supported relative to said cylinder head for injecting fuel into said recess, and a spark plug which is supported relative to said cylinder head and which extends into said recess for creating a spark, said spark plug being located directly above said intake port.

30. An internal combustion engine comprising an engine block defining a cylinder having a longitudinal axis, an upper end, and a cross-sectional area in a plane perpendicular to said axis, said engine block also defining intake and exhaust ports communicating with said cylinder, said ports being generally diametrically opposed relative to said cylinder, a piston reciprocally moveable in said cylinder along said axis, said piston having an upper surface having therein a generally circular bowl, said bowl having an area in a plane perpendicular to said axis, and said bowl having a planar bottom surface perpendicular to said axis, a cylinder head including a lower surface portion closing said upper end of said cylinder, said lower surface portion extending generally perpendicular to said axis and having therein an upwardly extending recess, said recess being located directly above said bowl, and said recess having an upper end, a lower end, and a height, said lower end of said recess having an area in a plane perpendicular to said axis, said recess area being equal to approximately one-fifth said cross-sectional area of said cylinder, and said recess area being greater than said bowl area, said height being equal to at least one-third of said cylinder diameter, a fuel injector supported relative to said cylinder head for injecting fuel into said upper end of said recess so as to create a cone of fuel spray surrounded by a volume of fuel vapor, said cone being centered on a cone axis parallel to or coaxial with said cylinder axis such that substantially the entirety of said fuel spray cone strikes said piston upper surface before striking any other surface, and a spark plug which is supported relative to said cylinder head, which extends into said recess, and which includes a spark gap located outside said fuel spray cone and within said fuel vapor volume, the distance from said spark gap to said upper end of said recess being greater than the distance from said spark gap to said piston upper surface when said piston is at top dead center, and said spark plug being located directly above said intake port such that said spark plug ignites said fuel spray before said fuel spray strikes said piston upper surface.

31. An engine as set forth in claim 30 wherein said recess is generally conical and converges upwardly.

32. An engine as set forth in claim 31 wherein said recess is centered on a line parallel to and offset from said cylinder axis.

33. An engine as set forth in claim 32 wherein said engine block and said cylinder head provide a smooth transition between said cylinder and said recess at a point directly above said intake port.

34. An engine as set forth in claim 30 wherein said recess is generally cylindrical.

35. An engine as set forth in claim 34 wherein said recess is centered on said cylinder axis.

36. An engine as set forth in claim 35 wherein said piston upper surface surrounding said bowl is convex, and wherein said cylinder head lower surface portion surrounding said recess is concave and complementary with said piston upper surface.

37. An engine as set forth in claim 30 wherein said height of said recess is approximately one-half of said cylinder diameter.

38. An engine as set forth in claim 30 wherein said piston upper surface is convex, and wherein said cylinder head lower surface portion is concave and complementary with said piston upper surface.

39. An engine as set forth in claim 30 wherein said fuel spray cone has an outside defining a line in a plane including said cone axis, said line and said cone axis forming an acute angle, and wherein said spark plug extends along a plug axis which is located in said plane and which is perpendicular to said line.

* * * * *